United States Patent [19]

Johnson

[11] Patent Number: 5,230,870
[45] Date of Patent: *Jul. 27, 1993

[54] METHOD FOR CONVERTING NOXIOUS POLLUTANTS FROM FLUE GAS INTO MERCHANTABLE BY-PRODUCTS

[76] Inventor: Arthur F. Johnson, 240 Fox Dr., Boulder, Colo. 80303

[*] Notice: The portion of the term of this patent subsequent to Jun. 16, 2009 has been disclaimed.

[21] Appl. No.: 888,931

[22] Filed: May 26, 1992

[51] Int. Cl.$^5$ ................ C01B 21/00; C01B 17/00; C01B 17/20
[52] U.S. Cl. .................. 423/235; 423/243.06; 423/545
[58] Field of Search ............ 423/243.06, 545, 235 D, 423/235

[56] References Cited

U.S. PATENT DOCUMENTS

| | | | |
|---|---|---|---|
| 1,685,388 | 9/1928 | White . | |
| 1,709,865 | 4/1929 | Muffly . | |
| 1,712,085 | 5/1929 | Litle . | |
| 2,109,780 | 3/1938 | Mott | 36/1 |
| 2,159,043 | 5/1939 | Orr | 29/189 |
| 2,174,792 | 10/1939 | Lampton | 29/151.5 |
| 2,212,481 | 8/1940 | Sendzimir | 29/188 |
| 2,234,839 | 3/1941 | Edwards | 18/56 |
| 2,244,475 | 6/1941 | Raskin | 62/126 |
| 2,294,137 | 8/1942 | Spofford | 148/4 |
| 2,399,650 | 5/1946 | Moyer | 250/83 |
| 2,438,851 | 3/1948 | Gates | 251/6 |
| 2,582,358 | 1/1952 | Schoellerman | 113/51 |
| 3,442,232 | 5/1969 | White | 110/18 |
| 3,456,928 | 7/1969 | Selway | 261/22 |
| 3,607,034 | 9/1971 | Henry et al. | 423/522 |
| 3,676,059 | 7/1972 | Welty | 423/242 |
| 3,770,385 | 11/1973 | Grey et al. | 23/260 |
| 3,839,849 | 10/1974 | Maniya | 55/222 |
| 3,880,618 | 4/1975 | McCrea et al. | 55/68 |
| 3,962,112 | 6/1976 | Shaheen | 423/243.06 |
| 4,051,225 | 9/1977 | Shiga et al. | 423/235 |
| 4,089,088 | 5/1978 | Konczalski | 23/277 |
| 4,101,635 | 7/1978 | Nambu et al. | 423/242 |
| 4,140,175 | 2/1979 | Darm | 165/115 |
| 4,160,810 | 7/1979 | Benson et al. | 423/220 |

(List continued on next page.)

FOREIGN PATENT DOCUMENTS

| | | |
|---|---|---|
| 0286892 | 3/1988 | European Pat. Off. . |
| 3541252A1 | 9/1986 | Fed. Rep. of Germany . |
| 35972 | 6/1906 | Hungary . |
| 55-105535 | 8/1980 | Japan . |

OTHER PUBLICATIONS

Charles Hodgeman, Robert Weast, Samuel Selby; Handbook of Chemistry and Physics; 43rd Edition; pp. 1704-1709, 1712-1713.

P.G.L. Thorne & E.R. Roberts; Fritz Ephraim Inorganic Chemistry; 1943; pp. ix-xii, 178 and 694.

Ralph F. Bovier; Proceedings of the American Power Conference; Apr. 14, 15 & 16 1964; article entitled "Sulfur-Smoke Removal System"; pp. 138-143.

Raisaku Kiyoura, Haruo Kuronuma and Gisuke Uwanishi; Bulletin of the Tokyo Institute of Technology; No. 81, 1967; article entitled "Studies on the Recovery of Sulphur Dioxide from Hot Flue Gases, to Control Air Polution;" pp. 1-5.

Primary Examiner—Gregory A. Heller
Attorney, Agent, or Firm—Pennie & Edmonds

[57] ABSTRACT

A system and method of converting flue gas pollutants to marketable byproducts of ammonium bisulfite and ammonium bisulfate, which are collected, and to other harmless byproducts which may be safely discharged is provided. The system removes as much particulate material and reaction inhibiting coal tar components as possible via an electrostatic precipitator and then passes the flue gas through a heat exchanger, wherein it is cooled by boiler feedwater. A suds producing detergent is introduced to the flue gas in order to separate any remaining coal tar components from the condensing moisture. Due to the removal of the tar components, sulfur dioxide and nitrous oxide readily dissolve in the condensing moisture when sufficiently cooled.

21 Claims, 4 Drawing Sheets

U.S. PATENT DOCUMENTS

| | | | |
|---|---|---|---|
| 4,339,883 | 7/1982 | Waldmann | 34/27 |
| 4,409,191 | 10/1983 | Osman | 423/220 |
| 4,444,128 | 4/1984 | Monro | 110/345 |
| 4,454,100 | 6/1984 | Faatz | 423/210 |
| 4,466,815 | 8/1984 | Southam | 55/120 |
| 4,526,112 | 7/1985 | Warner | 110/345 |
| 4,557,202 | 12/1985 | Warner | 110/216 |
| 4,582,122 | 4/1986 | Fan | 165/1 |
| 4,597,433 | 7/1986 | Johnson | 165/4 |
| 4,600,561 | 7/1986 | Frei | 422/170 |
| 4,619,671 | 10/1986 | Ruff et al. | 55/222 |
| 4,744,967 | 5/1988 | Brand et al. | 423/239 |
| 4,776,391 | 10/1988 | Warner | 165/111 |
| 4,781,797 | 11/1988 | Johnson | 202/173 |
| 4,783,326 | 11/1988 | Srednicki | 423/242 |
| 4,793,981 | 12/1988 | Doyle et al. | 423/239 |
| 4,802,897 | 2/1989 | Johnson | 55/55 |
| 4,829,911 | 5/1989 | Nielson | 110/234 |
| 4,871,522 | 10/1989 | Doyle | 423/239 |
| 4,874,585 | 10/1989 | Johnson et al. | 422/171 |
| 4,876,986 | 10/1989 | Johnson | 122/20 B |
| 4,900,403 | 2/1990 | Johnson | 203/78 |
| 4,910,011 | 3/1990 | Dörr et al. | 423/522 |
| 4,932,334 | 6/1990 | Patte et al. | 110/216 |
| 5,051,245 | 9/1991 | Wilson et al. | 423/242 |
| 5,122,552 | 6/1992 | Johnson | 423/545 |

METHOD FOR CONVERTING NOXIOUS POLLUTANTS FROM FLUE GAS INTO MERCHANTABLE BY-PRODUCTS

FIELD OF THE INVENTION

This invention relates to a system for the removal of noxious pollutants, including compounds of sulfur and nitrogen, from boiler plant flue gases. It also relates to a system for the production of ammonium bisulfate and ammonium bisulfite.

BACKGROUND OF THE INVENTION

Boiler plants, particularly those which generate heat through the combustion of coal, are well known sources of air and water pollution. The emissions of sulfur from these plants have been well-documented as a major Contributor to the problem of "acid rain". Various toxic or otherwise undesirable compounds are also produced during the combustion of coal, these including uranium, beryllium, chromium, barium, arsenic, selenium, mercury and coal tar.

The worsening environmental impact of the above described pollutants has become increasingly apparent in the last decade. Thus, considerable resources have been expended to come up with reliable and environmentally acceptable ways of removing the pollutants from flue gas emissions.

The currently available techniques for removing these pollutants include cooling the flue gas down to condensation within a heat exchanger that heats boiler feedwater. The prior art, for example, recognizes that cooling flue gases that contain sulfur trioxide and water vapor will result in condensation of sulfuric acid. See U.S. Pat. No. 4,526,112 to Warner; U.S. Pat. No. 4,874,585 to Johnson et al; and U.S. Pat. No. 4,910,011 to Dorr et al.

Although the aforementioned systems are more or less effective in removing some degree of the pollutants from the flue gas, they merely shift the pollution category from atmospheric waste to solid waste. Attempts have therefore been made to convert pollutants into useful products as they are removed from the flue gases.

One such approach involves the introduction of ammonia to combine with sulfur oxides in flue gases and form ammonium bisulfite and/or ammonium bisulfate.

This approach fails to address the presence of other pollutants in the flue gas, such as nitrogen compounds, uranium, beryllium, chromium, barium, arsenic, selenium, mercury and coal tar. Further, optimum transfer of heat to the boiler feedwater requires the utilization of densely packed tubes through the heat exchanger. Thus, the approach as described above is inefficient and commercially impracticable because the dry products produced thereby have a tendency to buildup on the tubes and to severely impede the flow of flue gas.

It has been further recognized in the prior art that $SO_2$ is not readily oxidized to $SO_3$ despite the presence of sufficient atmospheric oxygen in the flue gas to react therewith. In response to this recognition, the prior art has introduced oxidizing agents such as hydrogen peroxide ($H_2O_2$) dissolved in water in order to precipitate $H_2SO_4$ from the sulfur dioxide within the heat exchanger. See, for example, U.S. Pat. No. 4,783,326 to Srednicki. However, the added cost of introducing the required amount of oxidizing agents make such systems economically unattractive as well as complex.

It is therefore an object of the present invention to provide a system for economically removing pollutants from flue gas by which substantially all oxides of sulfur and nitrogen, as well as other harmful contaminants are removed.

It is a further object of the invention to provide such a system in which the oxides of sulfur and nitrogen are not merely removed from the flue gas to be disposed elsewhere, but are converted into useful and environmentally safe substances, particularly ammonium sulfate, ammonium bisulfate, and ammonium sulfite.

It is another object of the present invention to provide such a system in which the formation of the useful byproducts does not hamper the proper functioning of the apparatus.

SUMMARY OF THE INVENTION

These and other objects of the present invention that would be apparent to one skilled in the art are provided by the present invention, which comprises a heat exchanger located along a duct containing flue gas to exhaust, means for introducing a ammoniacal substance to said flue gas, means for introducing a suds producing detergent to the flue gas, means for collecting ammonium bisulfate and ammonium bisulfate formed by the reaction of the ammoniacal substance with oxides of sulfur in the flue gas, and means for removing particulate material from the flue gas before it enters the heat exchanger.

Boiler feedwater is delivered to the heat exchanger after passing through a condenser. The boiler feedwater moves upwardly through the heat exchanger through either acid-proof copper alloy pipes or between closely spaced, acid-resistant roll-bonded sheets having serpentine circuits therebetween.

According to another aspect of the invention, a method of removing pollutants from the flue gases includes exchanging heat between flue gas and condensed boiler feedwater to cool the flue gas down to a first temperature whereat substantially all $SO_3$ in the flue gas is combined with $H_2O$, condensing the $SO_3$ and $H_2O$ from the flue gas as a first condensate, adding a solution containing an ammoniacal substance and a suds producing detergent to the flue gas, collecting the soap suds produced after the adding step and the first condensate as a first solution, and separating ammonium bisulfate from the first solution.

The method further includes the steps of exchanging heat between said flue gas and cooling water at a precisely controlled temperature to cool the flue gas down to a second temperature, condensing $H_2O$ from the flue gas as a second condensate, dissolving $SO_2$ in the flue gas into the second condensate; and collecting the second condensate and part of the ammoniacal substance introduced during said addition step to form a second solution containing ammonium bisulfite.

DETAILED DESCRIPTION OF THE PREFERRED EMBODIMENT

Figure 1:
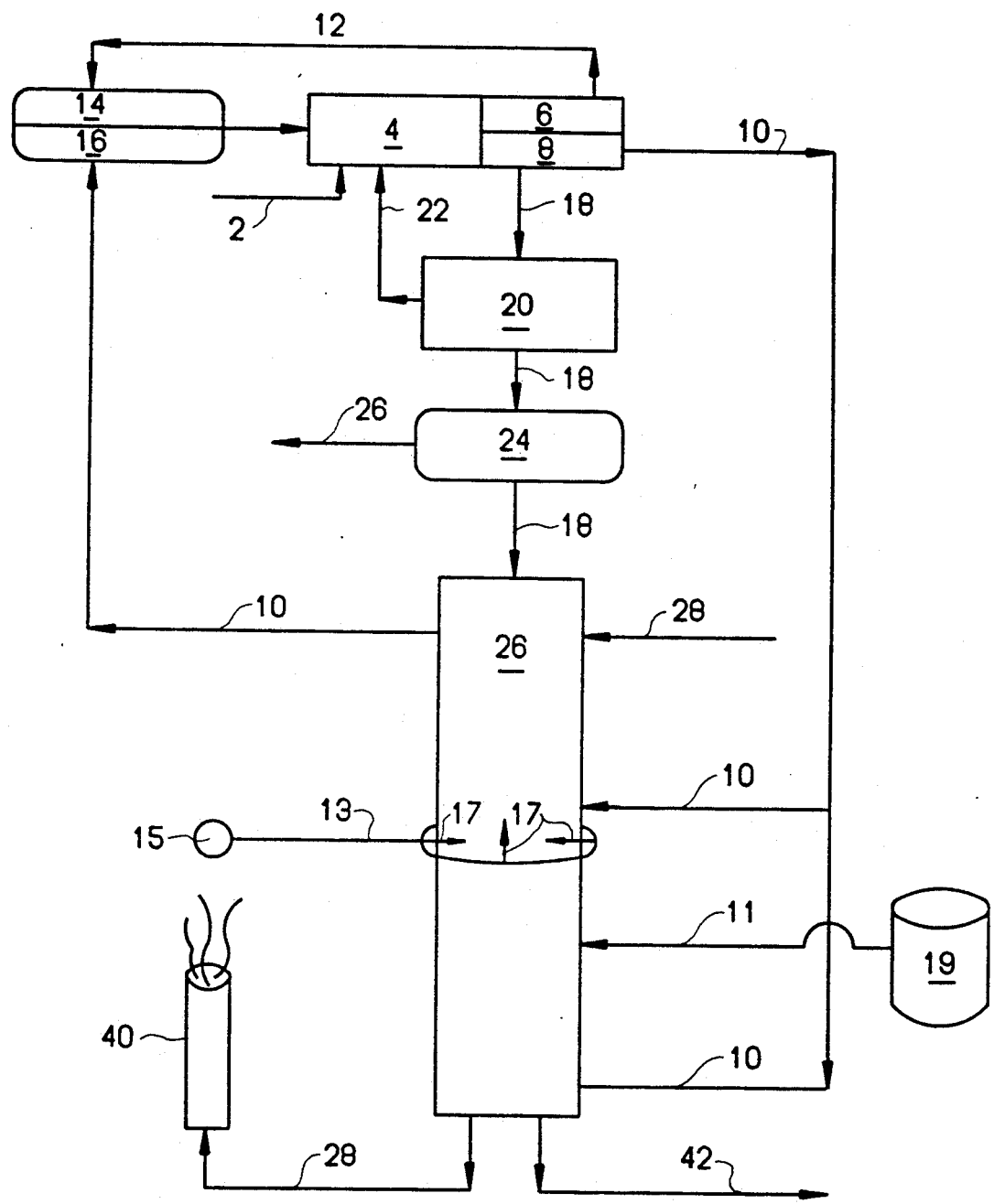
FIG. 1 is a flow chart showing the arrangement of the components of the present invention along the flows of flue gas and boiler feedwater in a typical o power plant application.

The flow diagram of FIG. 1 shows the basic configuration of the invention within a conventional power plant system. Fossil fuel 2 is supplied to a boiler 4 which produces steam. The steam drives turbines 6, and a condenser 8 then cools the steam, returning it to the boiler feedwater state. The condensed feedwater 10 exits the condenser at about 40° F. to 80° F. Some remaining wet steam 12 is used in a preheater 14 for the boiler feedwater, which is returned to the boiler via pumps 16.

Flue exhaust gas 18 leaving the boiler is first cooled from about 700° F. to about 600° F. by passing it through an air preheater 20. Preheating the boiler combustion air increases the efficiency of boiler combustion.

The flue gas is next directed through an electrostatic precipitator or baghouse 24 to remove particulates 26, such as fly ash. This serves two purposes. First, by removing them prior to introduction of the flue gas into the heat exchanger, the particulates are prevented from accumulating on the heat exchanging surfaces and thus from interfering with heat transfer processes. Second, the adverse effects of particulate pollutants on the desired reactions taking place within the heat exchanger are minimized.

As a matter of chemistry, it has long been known that the presence of certain substances can have a "negative catalytic effect" on reactions between other substances. Fly ash and other particulates in the flue gas contain coal tar components such as phenol, which can act as a negative catalyst to the reactions sought by the present invention. For example, one of the reactions sought by this invention and impeded by the presence of coal tar components is the reaction of $SO_2$ in the flue gas with ammonium hydroxide.

For the above reasons, the baghouse 24 is placed ahead of the heat exchanger 26 to minimize the amount of the coal tar derivatives present in the flue gas. After the flue gas passes through baghouse 24, wherein it may cool to a temperature of approximately 700° F., the flue gas is drawn downwardly at approximately 40 feet per second through a vertical heat exchanger 26 by a conventional induced draft fan, not shown. Heat is exchanged therein between the flue gas and boiler feedwater thereby reducing the amount of fuel needed to heat the feedwater.

Figure 3:
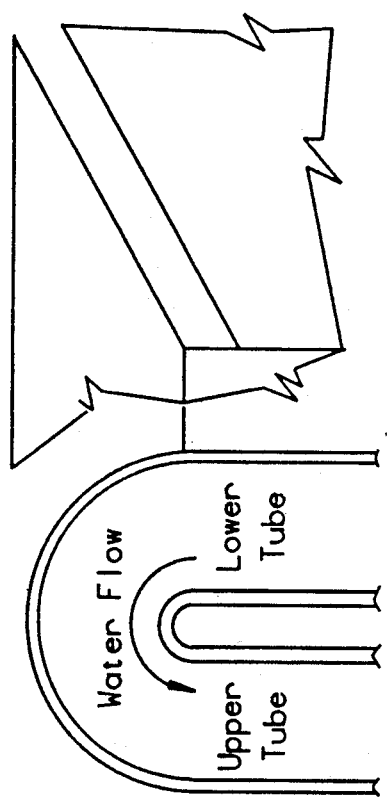
FIG. 3 is a cut-away view of the heat exchanger showing a arrangement of roll-bonded sheets which may be used to carry boiler feedwater through the heat exchanger.

As best shown in FIG. 3, the heat exchanger is preferably comprised of a acid proof housing, preferably formed of plastic, and a vertical column of consecutive, spaced layers of acid proof fluid conveying means carrying boiler feedwater therethrough.

Preferably, the fluid conveying means are parallel, horizontally spaced sheets 23 of stainless steel or other corrosion resistant metal having a serpentine circuit provided between adjacent sheets. The serpentine circuits are formed by a plurality of vertically spaced, horizontally extending raised portions or corrugations 21 on the surfaces of the sheets 23. These raised portions are preferably formed on the sheets by rollbonding, although any conventional method of producing spaced projections on a sheet of metal may be used.

The sheets are preferably arranged so that respective raised portions 21 of one sheet are positioned opposite to corresponding flat portions of the sheet facing it. The alternating "washboard" arrangement of raised portions and flat portions on each sheet results in a zig-zag flow pattern which greatly increases the heat transfer rate. Each serpentine circuit includes an inlet 23a, where cool water enters the heat exchanger, and an outlet 23b where hot water exits the heat exchanger.

Figure 4:
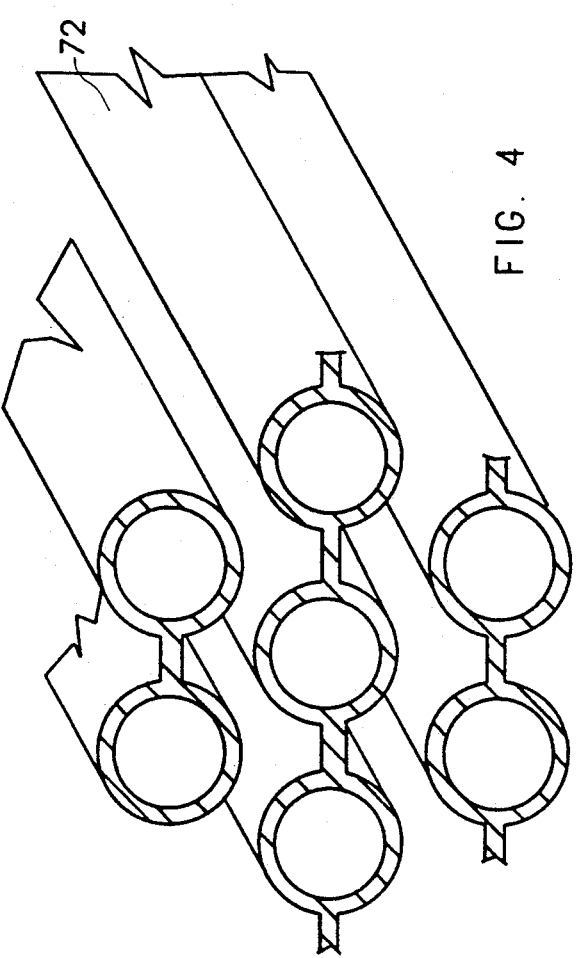
FIG. 4 is a detail of the end of the tubes which are used in the heat exchanger made by roll-bonding sheets or in lieu of these.
Figure 5:
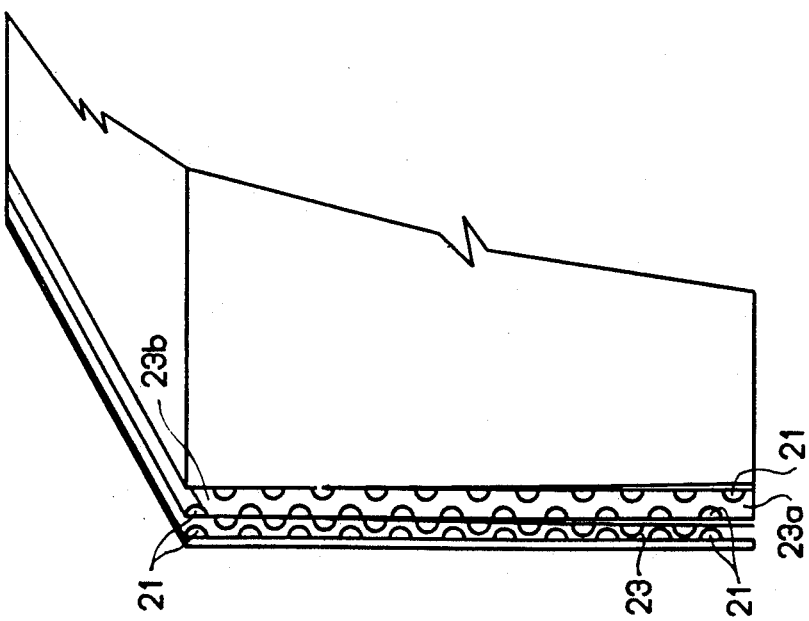
FIG. 5 is a cutaway view showing the connection between the tubes of the arrangement in FIG. 4.

Alternatively, and as illustrated in FIGS. 4 and 5, vertically spaced, horizontally extending tubes 72 may be used in lieu of the roll bonded sheets. Preferably, tubes 72 are constructed of a nylon coated copper nickel alloy. However, other metal or metal alloys having high thermal conductivity and suitable corrosion protection may also be used. The ends of tubes 72 are connected by a suitable bend as shown in FIG. 5.

Figure 6:
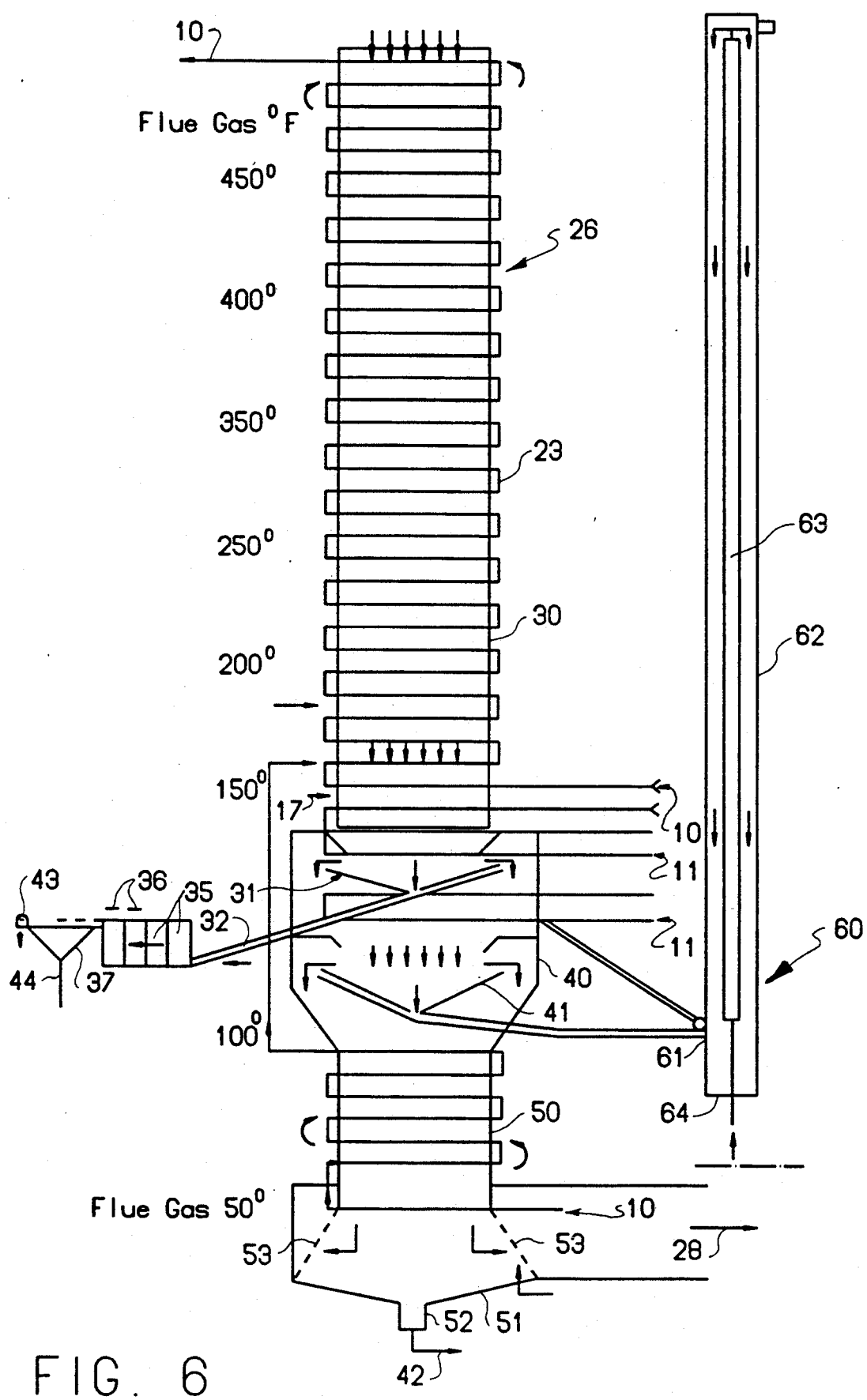
FIG. 6 is a diagrammatic flowsheet showing the arrangement of the heat exchanger, recirculating air lift, and mineral flotation and filtering system.

As shown in FIG. 6, the layers of heat exchanging pipes or rollbonded sheets are arranged in three sections 30, 40, and 50. The sections are separated from each other by inverted pyramid shaped pans 31 and 41, each of the pans serving to collect and funnel corresponding condensate solutions which precipitate at various temperatures within the heat exchanger. The condensate solution 33 collected by the first pan o 31 contains both noxious impurities as well as marketable ammonium sulfate. The condensate solution 43 collected by the second pan 41 contains ammonium bisulfite, herewith converted to ammonium bisulfite. Lastly, a third pan 51 forms the base of the heat exchanger and collects purified condensate 42 from the flue gas for disposal in streams, lakes, or the ocean. Preferably, these pans are made of plastic and have deep, downwardly sloping grooves formed on their upper surfaces to carry off condensates from high velocity flue gas.

Even after it passes through the baghouse 24, I have found that the flue gas 18 still contains significant quantities of phenol and other compounds. Further, I have discovered that these trace quantities form a coating on each and every drop of condensing moisture and that this coating resists the dissolution of $SO_2$ into the condensate.

The present invention ensures that the $SO_2$ contained in the flue gas is dissolved in the moisture of condensation by means which will be explained below. According to the invention, solid ammonium bisulfate or ammonium sulfite, useful as fertilizer, is then formed by the introduction of a sufficient amount of either ammonia or ammonium hydroxide, and a suds-producing detergent or soap into the flue gas at certain specified locations.

The operation of the present invention may be best understood by reference to FIG. 6. As the flue gas is cooled in the heat exchanger 26, $H_2SO_4$ is produced by the reaction of the $SO_3$ with $H_2O$. These reactions begin at high temperatures with $SO_3$ producing $H_2SO_4$ with no molecules of $H_2O$ at 626° F., 1 molecule of water at 554° F., 2 molecules of $H_2O$ at 333° F., and 4 molecules of $H_2O$ at 250° F.

When the flue gas has been cooled to a temperature below 212° F. but still above the point of condensation of moisture (which will vary depending upon the fuel used), fine sprays 17 of ammonium hydroxide and suds-producing detergent or soap are injected, via line 13, under pressure from pump 15 into the flue gas from locations around the acid proof plastic enclosure housing the heat exchanger. These sprays are added just before the first moisture condenses within the flue gas, preferably at a point. within 2° F. from the moisture condensation point.

It is important that ammonia not be added at a temperature too much above the moisture condensation point because crusts of ammonium sulfate may form on the walls of the chamber or between the closely spaced layers of acid-proof heat exchanger tubes or rollbonded sheets which contain the condenser feedwater. To achieve precise regulation of the flue gas temperature, cooling water 11 having a precisely controlled inlet temperature is preferably introduced into the heat exchanger. The cooling water may be drawn from a conventional tank or reservoir 19 and introduced into by several layers of acid proof pipes or roll bonded sheets at a point just following the level where $NH_4OH$ is injected, The $SO_3$ reports in the first condensate as $H_2SO_4$, which in turn reacts with some of the injected ammonium hydroxide to form ammonium bisulfate. A lc solution 32 containing ammonium bisulfate, soap suds, and other trace pollutants collects in first pan 31 and drains into a conventional mineral flotation machine 34. The flotation machine 34 has a plurality of mineral flotation cells 35. The soot and other coal tar components collected with the first solution 32 is floated to the surface of the floatation cells 35 via tiny soap bubbles and moves from right to left by skimmers 36 which rotate clockwise. The "pulp" or liquid solution of soluble ammonium sulfates and insolubles which are suspended therein moves from right to left through the cells and into a V-shaped tank 37. Waste, soot, and insoluble pollutants are separated and removed from the liquid solution by a vacuum filter 43, whereafter a purified solution of soluble ammonium sulfates 44 may be removed, separated by differential crystallization, and then marketed as crop fertilizer or the like.

Figure 2:
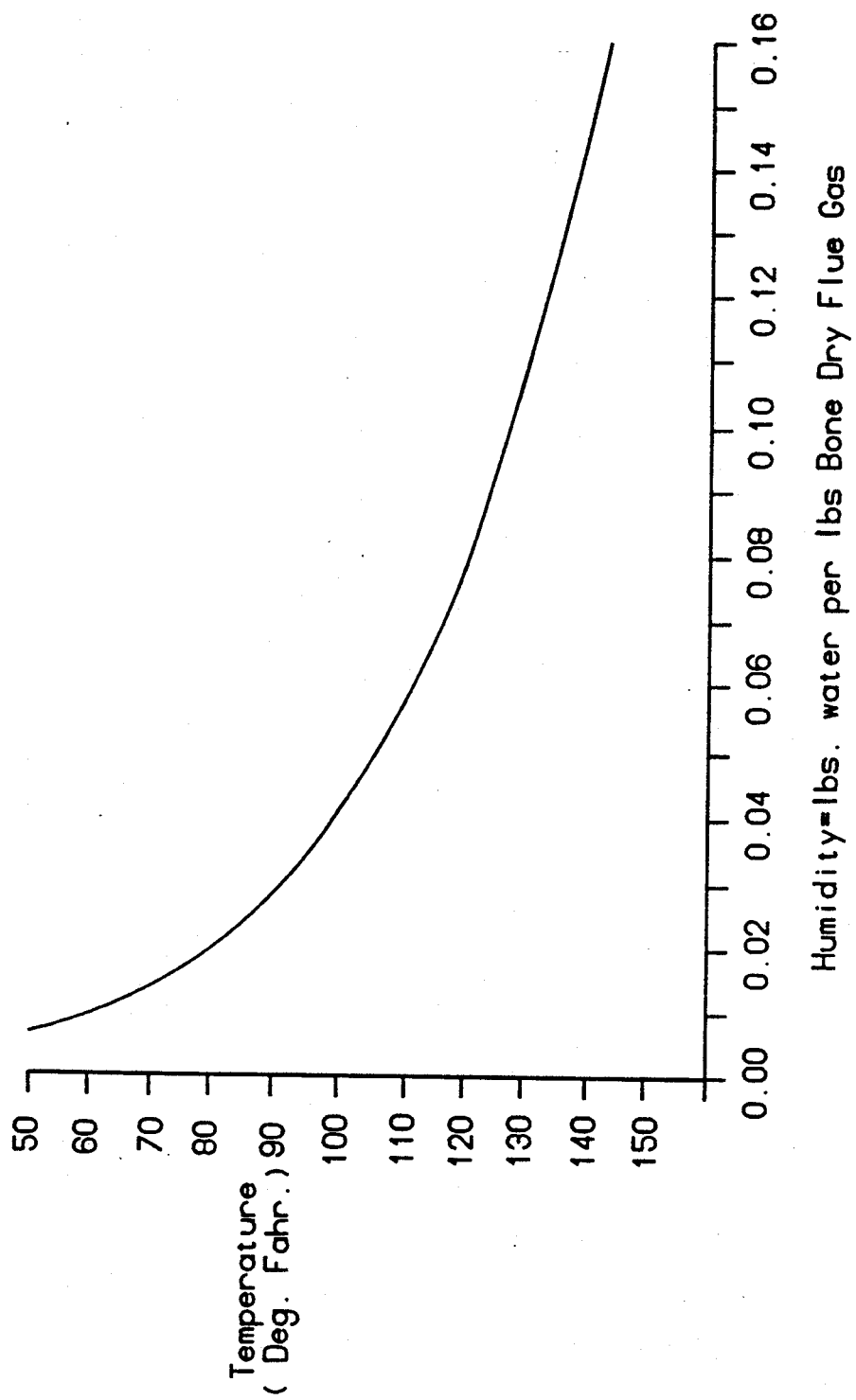
FIG. 2 is a humidity chart showing the LBS of water per LB of "bone dry" flue gas.

Referring now to FIG. 2, it is possible to determine how much $H_2O$ will condense from the flue gas as it is cooled. Burning 1 lb of coal normally produces approximately 10 lbs of flue gas. Using the chart of FIG. 2, cooling 10 lbs of flue gas from 120° F. to 116° F. will condense 1.2 lbs of $H_2O$. At approximately 115° F., the $SO_2$ in the flue gas will dissolve into the soot-free condensing moisture, whereafter it reacts with ammonium hydroxide to produce ammonium sulfite in accordance with the following formula:

$$SO_2 + NH_4OH \rightarrow NH_4HSO_3$$

The resulting condensate containing the ammonium sulfite collects on the second pan 41 for removal and conversion into ammonium bisulfate as will be described below.

Although the present invention is capable of dissolving all of the $SO_2$ into the $H_2O$ and converting it to $NH_4HSO_3$ (ammonium bisulfite), it may be necessary to supply more water than that provided by condensation. Accordingly, sufficient water may be included in the ammonium hydroxide and detergent sprays.

The collected ammonium sulfite drains from the second pan 41 and is introduced into an inlet 61 of a conventional recirculating Pohl air lift 60. Preferably, the recirculating lift 60 comprises a cylindrical tank 62 having an approximate height of 30 feet and an approximate diameter of 6 feet axially aligned within a Pohl air lift pipe 63 having a diameter of approximately 10 feet. Ammonia ($NH_3$) and atmospheric oxygen $O_2$ are introduced through an inlet 64 in the bottom of the tank 62. The lift evolves moist air, which exits through an outlet 65 proximate the top of the lift pipe 63, thus concentrating the solution contained therein. The $NH_3$, $O_2$, and $NH_4HSO_3$ react in the recirculating lift in accordance with the following equation:

$$2NH_4HSO_2 + 2NH_3 + 2O_2 \rightarrow 2(NH_4)_2SO_4$$

The ammonium bisulfate produced is collected and removed from the lift, whereupon it may be marketed as a crop fertilizer as previously described.

In some cases, it is recognized that a power plant may be unable to obtain boiler feed water cold enough to cool the flue gas below 120° F. Here again the present invention advantageously utilizes the injection of fine sprays of water into the heat exchanger in order to cool the flue gas by the heat of evaporation. For example, 0.01 lbs of added $H_2O$ cools the flue gas by the heat of evaporation, which in this case equals 10 BTU/0.29 (specific heat of flue gas) or 34° F. Flue gas at a temperature of 130° F., for example, may thus be cooled to 96° F. by injecting additional water. The injected cooling water must be at 86° F. or less in order to cool the flue gas to 96° F. in the manner described above.

Preferably the action of the heat exchanger, supplemented if needed by additional water injection, cools the flue gas to approximately 50° F.

Because the cooled flue gas has already been cleaned of soot and coal tar derivatives, the NO present therein will now readily dissolve in the $H_2O$. Once dissolved, the NO reacts with introduced atmospheric oxygen and the remaining ammonium hydroxide according to the following equation:

$$O_2 (AIR) + 4NO + 4NH_4OH \rightarrow 4NH_4NO_2 + 2H_2O$$

The $NH_4NO_2$ then decomposes into $N_2$ and $H_2O$.

The final purified condensate 42 collected in the base pan 51 is substantially detoxified and can be safely discharged through an outlet 52 as waste water from the facility. A set of demisting screens 53 is provided to catch droplets of moisture before the flue gas exits through the exhaust duct 54.

After the pollutants have been removed therefrom in the manner described above, the cleaned and cooled flue gas 28 is blown by an induced draft fan through an exit duct 54 by which it is led to a smoke stack 40.

Ordinarily, flue gas would contain more pollutants and would have to be discharged out of a high stack. However, a high flue gas temperature is necessary to successfully discharge gas through such stacks, which are often hundreds of feet high. The purity of the flue gas treated by the present invention allows a shorter stack to be used in discharging the gas. This, in turn, obviates the need to maintain the gas at an elevated temperature so that additional cooling and heat recovery may be obtained.

What is claimed is:

1. A method for removing pollutants from boiler plant flue gases comprising the steps of:
   (a) exchanging heat between a flue gas which contains $SO_2$, $SO_3$ and NO pollutants and a first fluid to cool the flue gas down to a first temperature whereat substantially all $SO_3$ in the flue gas is combined with $H_2O$;

(b) condensing the $SO_3$ and $H_2O$ from the flue gas as a first condensate;

(c) adding a solution containing an ammoniacal substance and a detergent to said flue gas to produce soapsuds and sulfates including ammonium bisulfate;

(d) collecting the soap suds and ammonium bisulfate produced after said adding step and the first condensate as a first solution; and (e) separating ammonium bisulfate from said first solution.

2. The method of claim 1 wherein said separating step comprises:

introducing said first solution into a mineral flotation system; and filtering out any insoluble contaminants suspended in said first solution.

3. The method of claim 2 wherein said separating step further comprises:

separating soluble sulfates from said first solution by differential crystallization.

4. The method of claim 1 further including the steps of:

exchanging heat between said flue gas and a second fluid, to cool the flue gas down to a second temperature, after the first temperature heat exchange step;

condensing $H_2O$ from the flue gas as a second condensate;

dissolving $SO_2$ in the flue gas into the second condensate; and collecting the second condensate and part of said ammoniacal substance to form a second solution containing ammonium bisulfite.

5. The method of claim 4, which further includes the steps of:

extracting said second solution; and combining at least part of said second solution with ammonia and air to produce a third solution containing ammonium bisulfate.

6. The method of claim 5 further including the step of:

reintroducing at least part of said first solution into flue gas which has undergone the second temperature heat exchange step to improve removal of $SO_2$.

7. The method of claim 5 wherein said combining step comprises:

introducing said second solution into an air lift recirculating means after said extraction step; and introducing ammonia and air into said air lift recirculating means.

8. The method of claim 1 further comprising the step of:

introducing water into the flue gas to raise the temperature of moisture condensation therein.

9. The method of claim 1 wherein the first heat exchange step comprises cooling the flue gas by passing it between a plurality of closely spaced, acid-proof alloy tubes.

10. The method of claim 9 which further comprises selecting a nylon coated, copper nickel material as the acid proof tubes.

11. The method of claim 1 wherein the first heat exchange step comprises cooling the flue gas by passing it between pairs of closely spaced acid resistant metal sheets, each pair of sheets including a serpentine path extending therebetween for the passage of boiler feedwater.

12. The method of claim 11 which further comprises selecting the acid resistant metal sheets for the first heat exchanger.

13. The method of claim 4 further comprising the steps of:

exchanging heat between said flue gas and a third fluid, to cool the flue gas down to a third temperature, after the second temperature heat exchange step;

condensing $H_2O$ from the flue gas as a third condensate;

dissolving NO in the flue gas into the third condensate; and collecting the third condensate and ammonium hydroxide introduced during said addition step to form a third solution containing $NH_4NO_2$ and water.

14. The method of claim 13, further comprising the steps of:

decomposing at least part of the $NH_4NO_2$ of said third solution into $N_2$ and water; and reintroducing at least part of said water into the flue gas to raise the temperature at which moisture condenses therein.

15. A method for removing pollutants from boiler plant flue gas comprising the steps of:

forming a first condensate by cooling a flue gas which contains $SO_2$, and $SO_3$ pollutants to condense water and substantially all $SO_3$ from said flue gas;

forming a second condensate by cooling said flue gas to condense water and substantially all $SO_2$ from said flue gas;

adding a solution of an ammoniacal substance and a detergent into said flue gas to produce soapsuds and sulfates including ammonium bisulfate in said first condensate and sulfites including ammonium bisulfite in said second condensate;

collecting and removing the condensates from the flue gas; and removing ammonium bisulfate from said first condensate.

16. The method of claim 15 further comprising the step of reintroducing at least part of said second condensate into said flue gas downstream of where the flue gas begins to condense.

17. The method of claim 15 which further comprises removing ammonium sulfite from said second condensate.

18. The method of claim 17 which further comprises extracting the second condensate containing the ammonium bisulfite and combining at least part of the extracted solution with ammonium and air to form ammonium bisulfate.

19. The method of claim 18 which further comprises reintroducing at least part of the extracted solution into flue gas which has undergone the first heat exchange step to improve the removal of $SO_2$.

20. The method of claim 18 which further comprises introducing the extracted solution, ammonia and air into an air lift recirculating means to form said ammonium bisulfate.

21. The method of claim 15 which further comprises introducing water into the flue gas to raise the temperature of moisture condensation therein.

* * * * *